United States Patent [19]
Watkins

[11] Patent Number: 5,333,911
[45] Date of Patent: Aug. 2, 1994

[54] CONNECTOR

[75] Inventor: Bruce J. Watkins, Houston, Tex.

[73] Assignee: Dril-Quip, Inc., Houston, Tex.

[21] Appl. No.: 26,554

[22] Filed: Mar. 4, 1993

[51] Int. Cl.⁵ .............................................. F16L 35/00
[52] U.S. Cl. ........................................ 285/18; 285/90; 285/309; 285/403
[58] Field of Search ................. 285/18, 141, 321, 404, 285/308, 90, 309, 310, 18, 403

[56] References Cited

U.S. PATENT DOCUMENTS

| | | | |
|---|---|---|---|
| 3,345,087 | 10/1967 | Hanes et al. | 285/321 X |
| 3,768,842 | 10/1973 | Ahlstone | 285/321 X |
| 4,092,036 | 5/1978 | Sato et al. | 285/321 X |
| 4,094,539 | 6/1978 | Reimert | 285/309 |
| 5,149,143 | 9/1992 | Howell . | |

FOREIGN PATENT DOCUMENTS 1107273  3/1968  United Kingdom .

OTHER PUBLICATIONS

Cameron Manual Tree Connector, p. 1089 of 1986–1987 *Composite Catalog of Oilfield and Pipeline Equipment.*
Vetco Marine Riser Connectors, p. 791 of 1986–1987 *Composite Catalog of Oilfield and Pipeline Equipment.*

Primary Examiner—Dave W. Arola
Attorney, Agent, or Firm—Vaden, Eickenroht, Thompson, Boulware & Feather

[57] ABSTRACT

There are disclosed several embodiments of a connector for connecting tubular members in end-to-end relation wherein a ring supported by the one tubular member carries arcuate latches which are adapted to be moved by radial actuators into and out of positions in which locking shoulders thereon are tightly engaged with a complementary locking shoulder about the other tubular member to hold the members in end-to-end relation.

9 Claims, 5 Drawing Sheets

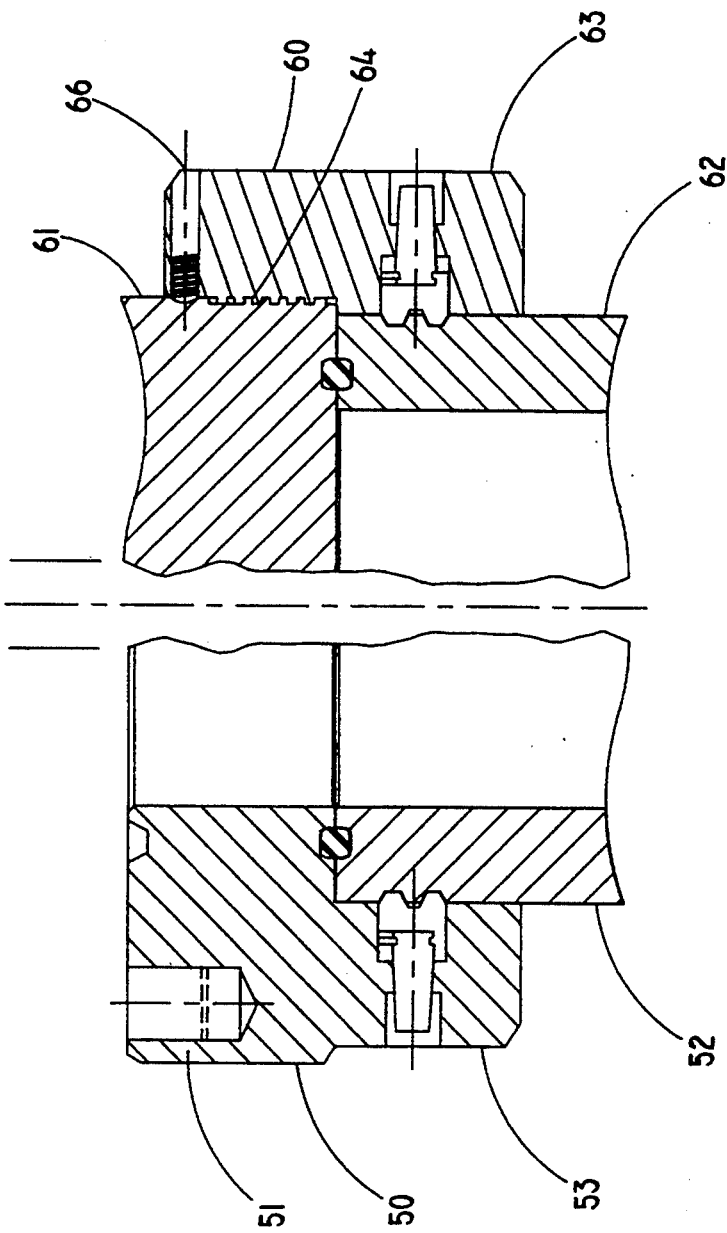

CONNECTOR

This invention relates generally to a connector for connecting tubular members in end-to-end relation, and thus, for example, connecting the lower end of a blowout preventer or a Christman Tree to the upper end of a wellhead member during the drilling or production stage of an oil or gas well. More particularly, it relates to improvements in a connector of this type in which a ring supported by the upper tubular member carries arcuate latches which are adapted to be moved by radial actuators into and out of positions in which locking shoulders thereon are tightly engaged with a complementary locking shoulder about the lower tubular member to hold the members in end-to-end relation.. Typically, the shoulders are conically shaped and extend downwardly and inwardly with respect to the vertical axes of the members to preload the engagement between the ends of the tubular member.

During the drilling stage of the well, the upper tubular member may be a blowout preventer or an adapter connected thereto. During the production stage, the upper tubular member may be a Christmas tree on an adapter connected thereto. The ring supported from the upper tubular member may be integral therewith or connected thereto as by means of threads.

As shown in U.S. Pat. No. 5,149,143, for example, the actuators may comprise bolts which are received in radially extending threaded holes in the ring and whose inner ends are so connected to mid points of the latches as to permit relative relation between them as the latches are guidably moved within a recess in the ring between their inner and outer positions. It has been found, however, that the ends of the latches and thus their locking shoulders may be caused to bend away from the locking shoulder, as they are forced against the locking shoulder, or in response to subsequently applied loads, thus limiting the circumferential engagement between the shoulders essential to a rigid connection.

It is therefore an object of this invention to overcome this problem, and, in particular, to provide a connector of this type which is of such construction as to insure essentially full circumferential loading between the shoulders.

These and other objects are accomplished, in accordance with the preferred and illustrated embodiments of the invention, by a connector which includes, as in prior connectors of this type, tubular members disposable in end-to-end relation, with the lower member having a locking shoulder facing away from its end and a ring being supported on the upper member and surrounding the lower member when disposed in end-to-end relation. More particularly, as in prior connectors of this type, arcuate latches each having a locking shoulder are carried about the inner side of the ring for guided movement by radially movable actuators mounted on the ring and connected to the latches between outer positions to permit the ring to be moved over the lower member and inner positions in which their locking shoulders are tightly engaged with the locking shoulder of the lower member so as to hold the members in end-to-end relation for moving the latches between their inner and outer positions.

In accordance with the novel aspects of the present invention, however, pushers are also mounted on the ring intermediate the actuators for inward movement, following movement of the latches into their inner positions, in order to engage and move portions of the locking shoulders of the latches which may have bent away from the locking shoulder of the first member more tightly thereagainst. In the preferred embodiment of the invention, each actuator is connected to a latch intermediate its ends, and the pushers are mounted on the ring on opposite sides of the actuator to engage and move the ends of the latches against the locking shoulder. More particularly, as shown, each pusher is engageable with the ends of adjacent latches.

As also shown, each actuator is a bolt or rod threadedly received in the ring for radial movement with respect to the ring, and so connected to the latch to permit relative rotation between them, and each pusher is a similar bolt or rod threadedly received in the ring for radial movement with respect to the ring into and out of engagement with the latches when in their inner positions.

In certain embodiments of the invention, the ring is connected as by threads to the second member in surrounding relation to the end thereof. In another embodiment, the ring is integral with and therefore part of the second member.

In the drawings, wherein like reference characters are used to designate like parts:

FIG. 9 is a vertical sectional view of another embodiment of the connector as seen along a section similar to that shown in FIG. 4; and FIG. 10 is a vertical sectional view of still another embodiment of the connector, as seen along a section similar to that of FIG. 4.

Figure 1:
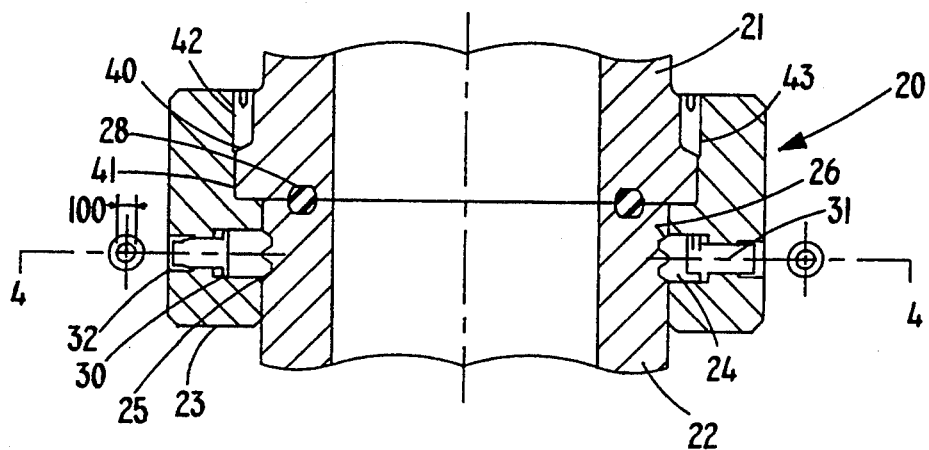
FIG. 1 is a vertical sectional view, as seen along broken lines 1—1 of FIG. 4, of a connector constructed in accordance with one embodiment of the present invention, and with the latches as well as the pushers moved inwardly to hold the upper and lower tubular members into end-to-end engagement.
Figure 2:
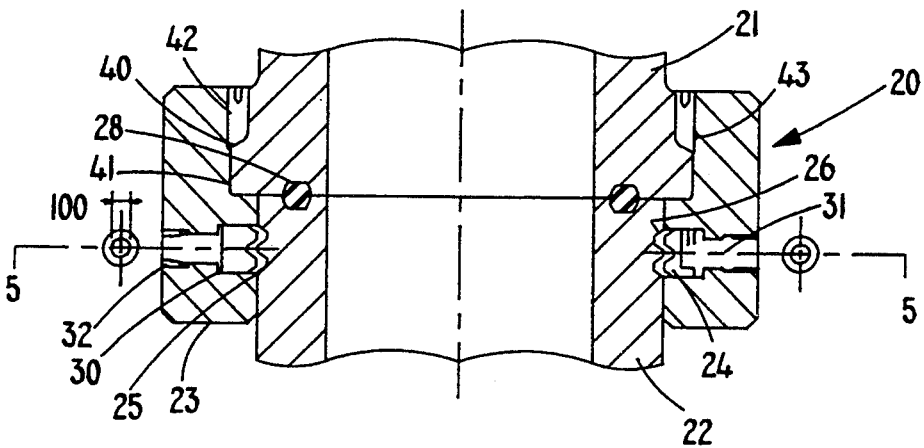
FIG. 2 is a view similar to FIG. 1, but as seen along broken lines 2—2 of FIG. 5 showing the latches and pushers in their outer positions.
Figure 3:
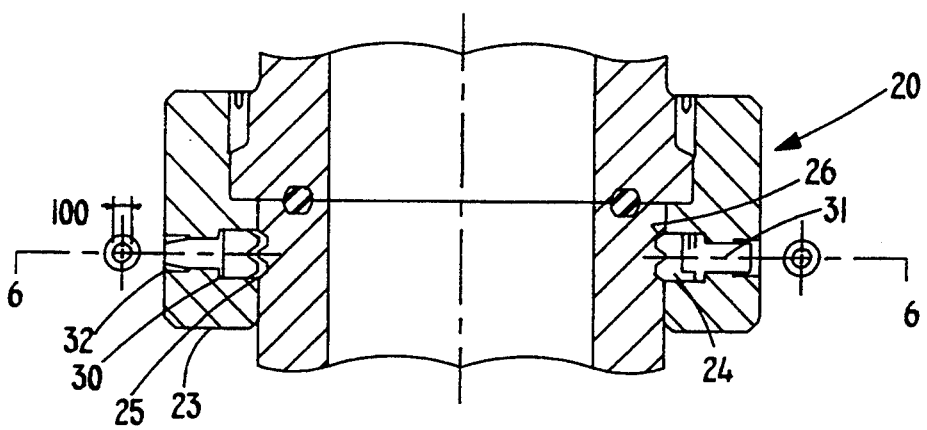
FIG. 3 is another view similar to FIGS. 1 and 2, and as seen along broken lines 3—3 of FIG. 6, but showing the latches moved inwardly, but the pushers in their outer positions.

With reference now to the details of the above described drawings, and particularly the embodiment of FIGS. 1 to 8, the overall connector, which is indicated in its entirety by reference character 20, is shown in FIGS. 1, 2, and 3 to comprise an upper tubular member 21, a lower tubular member 22, and a ring 23 supported by the upper tubular member and surrounding the upper end of the lower tubular member. More particularly, and as previously described, arcuate latches 24 are carried about the inner circumference of the ring for movement inwardly to cause teeth on their inner ends to engage within grooves 25 formed about the outer circumference of the lower tubular member so as to hold the tubular members in end-to-end relation.

As previously described, the lower tubular member 22 may be a wellhead member, while the upper tubular member may be the lower end of a blowout preventer, during the drilling stage of oil, or a Christmas tree, during the production stage, or an adapter at the lower end of either.

As shown, the latching grooves 25 have downwardly and inwardly tapered conical locking shoulders 26 formed thereon which are engaged by complementary conical surfaces formed on the upper sides of teeth on the inner sides of the latches. Thus, as the inner ends of the latches are moved inwardly into the groove, their locking shoulders slide over the locking shoulders of the wellhead member to force the ends of the tubular members into tight engagement and thus preload a seal ring 28 carried in matching grooves in their opposite ends.

Figure 4:
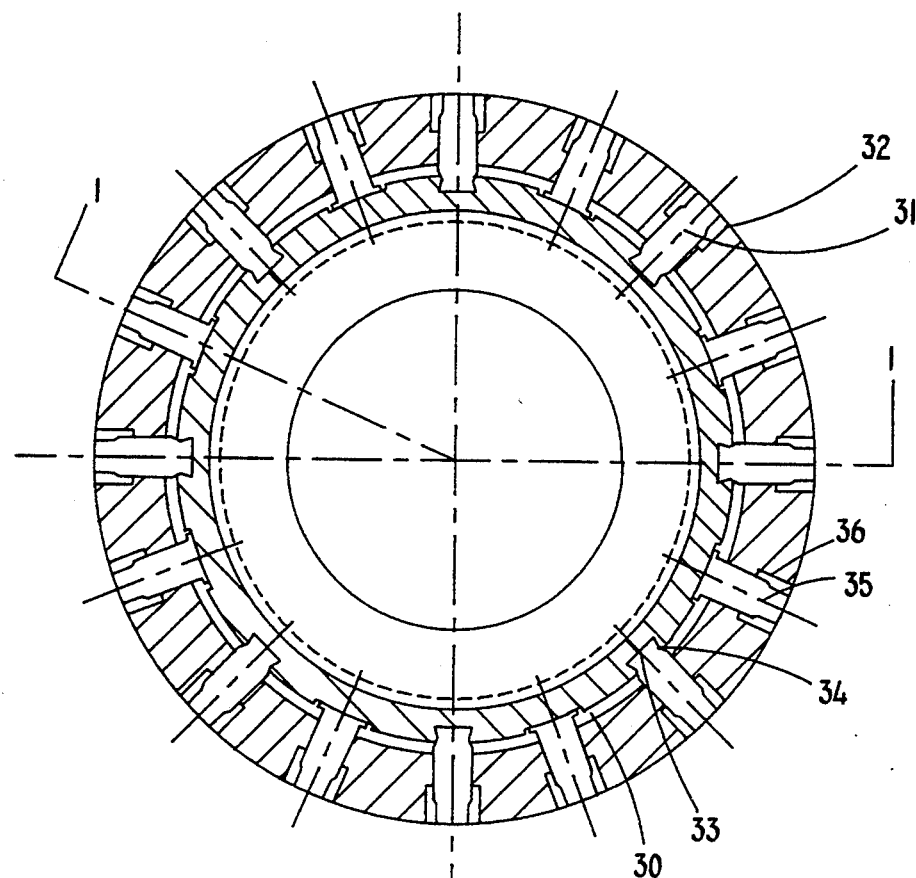
FIG. 4 is a horizontal sectional view of the connector, as seen along broken lines 4—4 of FIG. 1.
Figure 5:
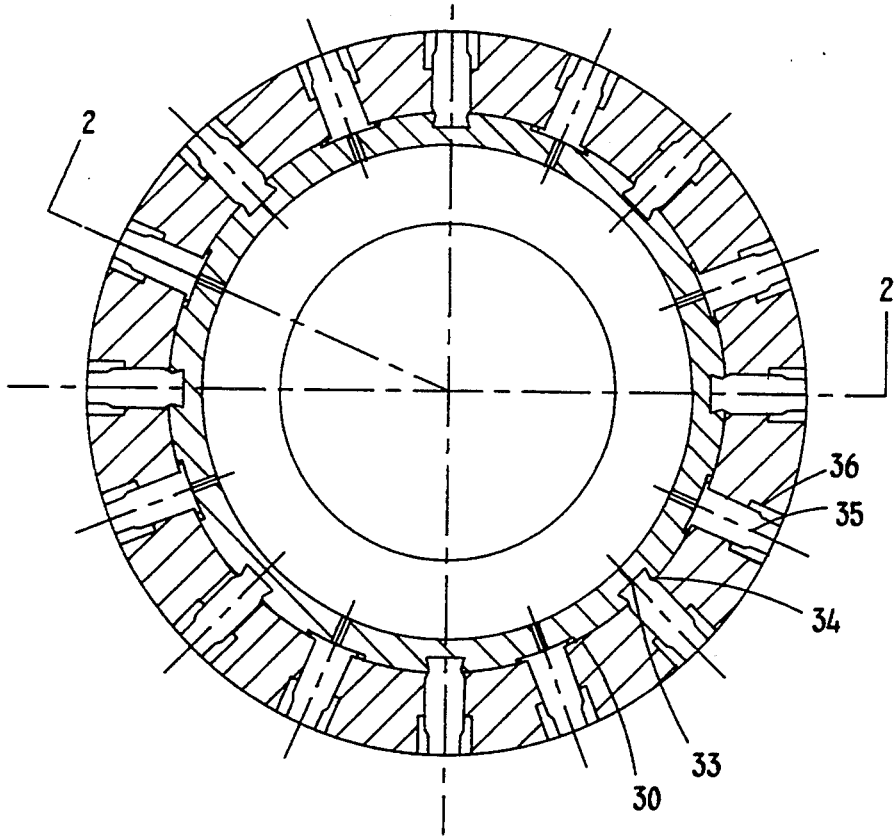
FIG. 5 is a view similar to FIG. 4, but as seen along broken lines 5—5 of FIG. 2.
Figure 6:
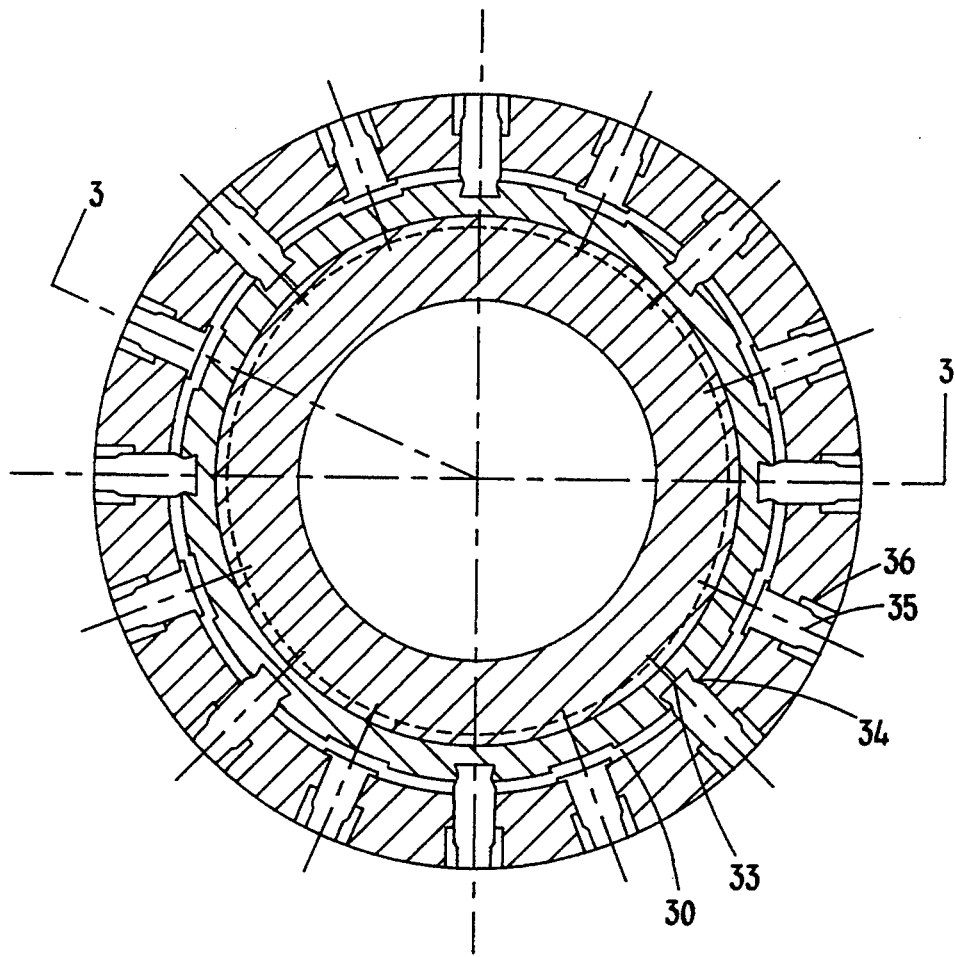
FIG. 6 is a view of the connector, similar to FIGS. 4 and 5, and as seen along broken lines 6—6 of FIG. 3.

As shown in FIGS. 4, 5, and 6, when moved inwardly to their latching positions, the opposite ends of the latches are substantially adjacent to one another so that they provide essentially full circumferential loading capability. Thus, the latches are guidably movable within an arcuate recess 30 formed about the inner circumference of the ring in a position opposite the latching grooves 25 when the upper tubular member is landed in end-to-end relation on the lower tubular member. More particularly, the latches are guidably movable within the recess by means of pushers in the form of bolts 31 threadedly received in radial holes 32 connecting the recess with the outer side of the ring.

As shown, the inner end of each of the bolts is connected to a mid point of a latch by a flange 33 adapted to fit within an upwardly opening recess 34 on the outer side of the latch so as to permit relative rotation between the latches and bolt as the bolts are rotated in opposite directions to move the latches between their inner and outer positions. The bolts may, of course, be moved to innermost positions to permit assembly and removal of the latches.

Since the inner ends of the actuator bolts 31 are connected to the latches generally intermediate the ends of the latches so as to move the mid portion of the latch segments tightly into engagement with the latching grooves about the lower tubular member, this initial loading, or subsequent loading during use, may cause the opposite ends of the latches to bend away from the latching groove. To overcome the lack of full loading which may thus occur, a plurality of pusher bolts 35 are threadedly received within radial holes 36 through the ring adjacent the opposite ends of the latches. As previously described, the inner ends of the pusher bolts may be moved between outer positions, so that, with the latches similarly in their outer positions, the upper tubular member may be lowered onto or raised from the lower tubular member, as shown in FIGS. 2 and 5.

Then, with the latches moved inwardly, the pusher bolts may be moved inwardly to engage with the outer ends of adjacent latches, as shown in FIGS. 1 and 4, so as to force them tightly against the latching groove 25. Thus, as best shown in FIG. 4, each pusher bolt spans the ends of adjacent latches and is provided with a flat flange on its inner end engagable with flats formed on the adjacent ends of adjacent latches. As in the case of the actuator bolts 31, the bolts 35 have outer ends which are accessible from the outer side of the ring to permit them to be moved between their inner and outer positions.

As illustrated in FIGS. 3 and 6, upon landing of the upper tubular member on the lower tubular member, the actuators are first caused to move the latches into the latching groove. When the latches have thus been moved firmly into the latching grooves, the pushers are actuated to move them inwardly to force the ends of the latches more tightly into the latching groove.

In the event, for example, the upper tubular member is a blowout preventer having rams extending radially from its sides, the ring must be moved into supported position on the upper tubular member from its lower end. Thus, as shown, the tubular member has an annular hub 40 about its lower end which is closely received within a recessed upper portion 41 of the inner circumference of the ring with the lower end of its recessed portion engaging the lower end of the hub 40. At this time, the ring is securely mounted on the upper tubular member by means of a threaded ring 42 received within an annular space between the outer side of the upper tubular member above the hub 40 and the upper end of the recessed portion 41. More particularly, the upper end of the recessed portion is threaded at 43 to connect with threads formed about the latch ring.

Figure 7:
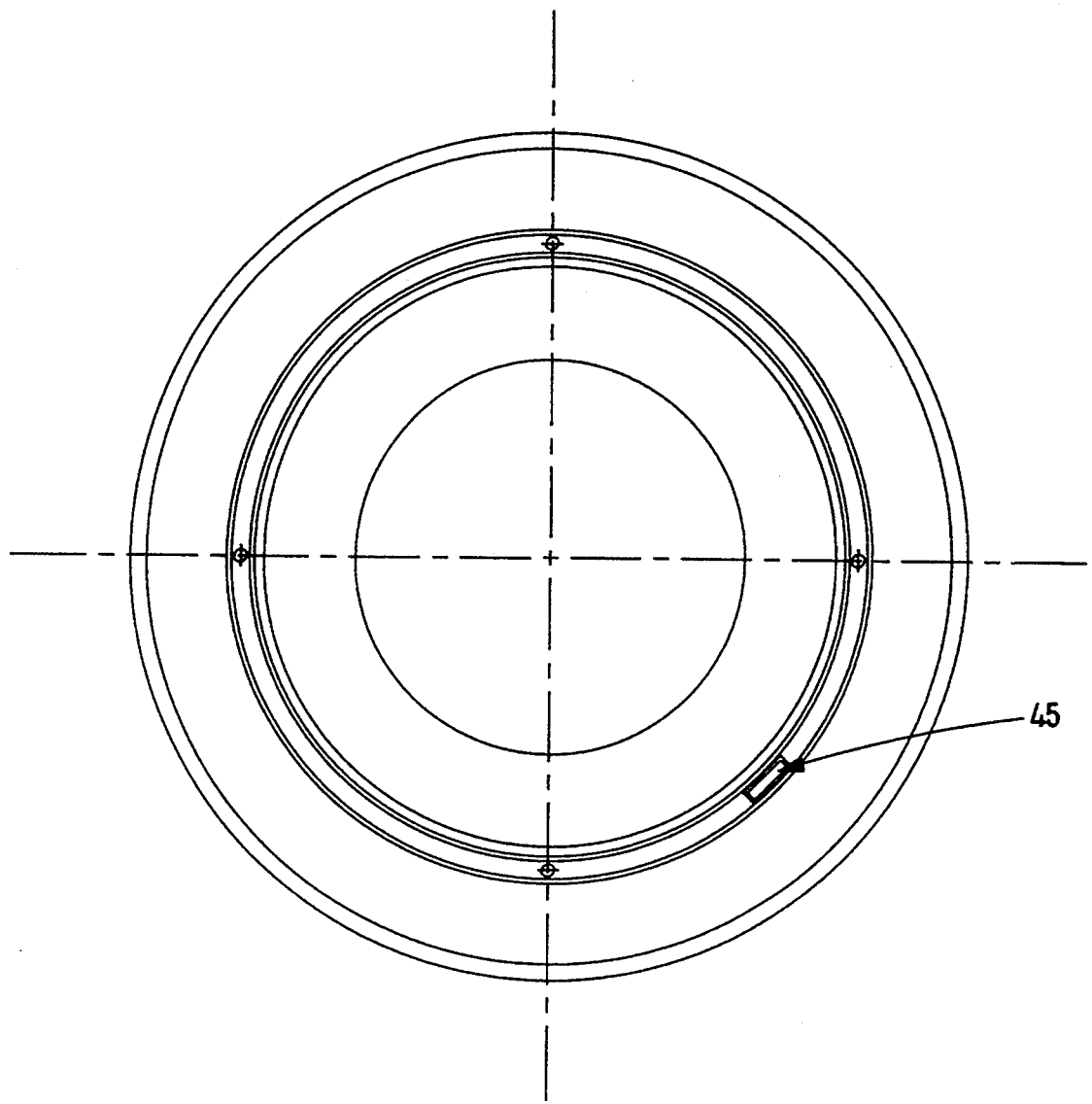
FIG. 7 is a top plan view of the connector.
Figure 8:
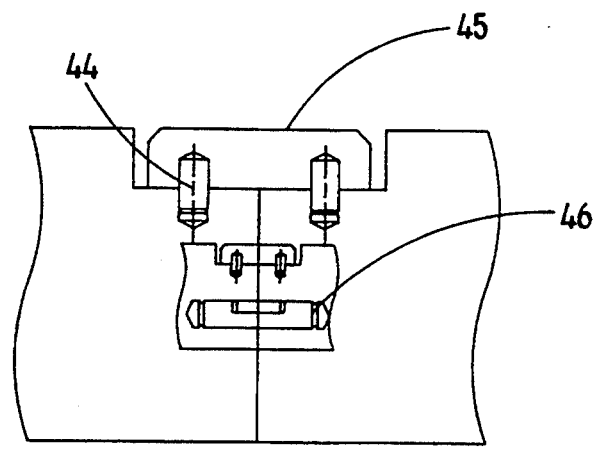
FIG. 8 is a detailed view of the connection of the ends of a threaded split ring connecting the ring of the connector to the upper tubular member.

To permit the latch ring to be assembled when the ring has been moved upwardly over the lower end of the upper tubular member, it is split about its circumference, as shown in FIGS. 7 and 8. Hence, it may be spread outwardly to move about the upper tubular member above the hub 40 and then permitted to move inwardly about the outer member so that it may be lowered into and threadedly engaged with the threads 43 on the ring. As shown in FIG. 8, the free ends of the ring may be held in end-to-end relation by means of pins 44 carried on a plate 45 fitable within a recess formed on the adjacent ends of the ring. Holes in the plate and latch ring are held in vertically aligned relation by means of a clasp 46 which extends between outer recesses in their adjacent ends, again as shown in FIG. 8.

The embodiment of the connector shown in FIG. 9, and indicated in its entirety by reference character 50, is similar to that of FIGS. 1 to 8 in that it is comprised of an upper tubular member 51, a lower tubular member 52, and a ring 53 which is supported from the upper tubular member 51 for surrounding the upper end of the lower tubular member 52 when they are disposed in end-to-end relation. As in the case of the embodiment of FIGS. 1 to 8, the ring carries latches 24 for movement between outer positions and inner positions engaged within the latching groove 25 about the lower tubular member, as well as pusher rods 31 also carried by the ring for movement between inner and outer positions. The latches and pusher rods cooperate to hold the upper and lower tubular member in tight end-to-end relation in the manner described in connection with the embodiments of FIGS. 1 to 5.

In this embodiment of the connector, the ring is supported from the upper tubular member by being formed integrally therewith. As shown, the upper side of the upper tubular member has threaded holes or sockets to receive studs for connection to the lower end of a blowout preventer or an adapter for it.

The embodiment shown in FIG. 10, and indicated in its entirety by reference character 60, is also similar to the embodiment of FIGS. 1 to 8 in that it also comprises an upper tubular member 61, a lower tubular member 62, as well as a ring 63 supported by the upper tubular member for surrounding the upper end of the lower tubular member 62 when the tubular members are disposed in end-to-end relation. As in the case of both of the previously described embodiments, the ring also carries latches 24 which are moved between outer positions and inner positions engaged in a latching groove 25 about the lower tubular member, as well as pusher rods 31 which are movable between outer and inner positions engaged with the ends of adjacent latches.

In this connector, the ring is supported from the upper tubular member by means of threads 65 and held against disconnection by means of a lock screw 66. In this case, as in the embodiment of FIGS. 1 to 8, the outer circumference of the lower end of the upper tubular member is greater than that of the upper end of the lower tubular member, so that the ring is assembled in supported position on the upper tubular member by being moved upwardly into threaded engagement with its lower end.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A connector comprising
   first and second tubular members disposable in end-to-end relation,
   said first member having a locking shoulder facing away from its end,
   a ring supported on said second member and having an inner side surrounding the first member when said first member is disposed in end-to-end relation with the second member, and
   arcuate latches each having a locking shoulder and carried about the inner side of the ring for guided movement between outer positions to permit the ring to be moved over the first member and inner positions in which their locking shoulders are tightly engaged with the locking shoulder of the first member so as to hold the members in end-to-end relation,
   actuators each connected to a latch intermediate its end and mounted on the ring for moving the latches between their inner and outer positions, and
   pushers mounted on the ring on opposite sides of each actuator for inward movement, following movement of the latches into their inner positions, to engage and move the ends of the locking shoulders of the latches more tightly against the locking shoulder of the first member.

2. A connector as described in claim 1, wherein
   each pusher is engageable with the ends of adjacent latches.

3. A connector as described in claim 1, wherein
   each actuator is a rod threadely received in the ring for radial movement with respect to the ring, and connected to the latch by a T-slot to permit relative rotation between them.

4. A connector as described in claim 3, wherein
   the pushers are rods threadedly received in the ring for radial movement with respect to the ring.

5. A connector as described in claim 1, including
   means for connecting the ring to the second member in surrounding relation to the end thereof.

6. A connector as described in claim 1, wherein
   the ring is part of the second member.

7. A connector comprising
   first and second tubular members disposable in end-to-end relation,
   said first member having a locking should facing away from its end,
   a ring supported on said second member and having an inner side surrounding the first member when said first member is disposed in end-to-end relation with the second member, and
   arcuate latches each having a locking shoulder and carried about the inner side of the ring for guided movement between outer positions to permit the ring to be moved over the first member and inner positions in which their locking shoulders are tightly engaged with the locking shoulder of the first member so as to hold the members in end-to-end relation,
   actuators connected to the latches and mounted on the ring for moving the latches between their inner and outer positions, and
   pushers mounted on the ring for inward movement, following movement of the latches into their inner positions, to engage and move the portions of the locking shoulders of the latches intermediate the actuators more tightly against the locking shoulder of the first member.

8. A connector as described in claim 7, wherein
   each actuator is a rod threadely received in the ring for radial movement with respect to the ring and connected to the latch by a T-slot to permit relative rotation between them.

9. A connector as described in claim 8, wherein
   the pushers are rods threadedly received in the ring for radial movement with respect to the ring.

* * * * *